(12) United States Patent
Loontjens et al.

(10) Patent No.: US 6,395,869 B2
(45) Date of Patent: May 28, 2002

(54) HIGH-MOLECULAR POLYAMIDE

(75) Inventors: Jacobus A. Loontjens; Bartholomeus J. M. Plum, both of Meerssen (NL)

(73) Assignee: DSM N.V. (NL)

( * ) Notice: Subject to any disclaimer, the term of this patent is extended or adjusted under 35 U.S.C. 154(b) by 0 days.

(21) Appl. No.: 09/772,870

(22) Filed: Jan. 31, 2001

Related U.S. Application Data

(63) Continuation of application No. 09/421,525, filed on Oct. 20, 1999, now Pat. No. 6,228,980.

(30) Foreign Application Priority Data

| Apr. 22, 1997 | (NL) | 1005866 |
| Apr. 20, 1998 | (WO) | PCT/NL98/00217 |

(51) Int. Cl.[7] .................. C08G 69/14; C08G 69/16; C08F 8/00
(52) U.S. Cl. .................. 528/310; 528/272; 528/288; 528/322; 528/323; 528/480; 528/486; 528/491; 528/492
(58) Field of Search .................. 528/480, 486, 528/491–492, 310, 323, 322, 272, 288

(56) References Cited

U.S. PATENT DOCUMENTS 6,228,980 B1 * 5/2001 Loontjens et al. .......... 528/480

FOREIGN PATENT DOCUMENTS

| EP | 0117433 A1 | 9/1984 |
| EP | 0288253 A2 | 10/1988 |
| GB | 1533650 | 11/1978 |
| WO | WO 96/34909 | 11/1996 |

OTHER PUBLICATIONS

Patent Abstract of Japan, vol. 013 No. 494 Nov. 8, 1989.
Patent Abstract of Japan vol. 013 No. 569 Dec. 15, 1989.
Patent Abstract of Japan JP–42–17832A, Aug. 1967.

* cited by examiner

*Primary Examiner*—P. Hampton-Hightower
(74) *Attorney, Agent, or Firm*—Pillsbury Winthrop LLP

(57) ABSTRACT

A high molecular weight polyester-amide block copolymer is produced by reacting a mixture of lower molecular weight polyester and polyamide in the melt with a carbonyl bislactam, especially carbonyl biscaprolactam. The higher molecular weight block copolymer may be obtained in as short a time as 2 minutes, whereas, at least about 10 minutes is required in a conventional process, under comparable conditions, using a bislactam.

7 Claims, No Drawings

HIGH-MOLECULAR POLYAMIDE

This is a continuation of application Ser. No. 09/421,525, filed Oct. 20, 1999 now U.S. Pat. No. 6,228,980.

FIELD OF THE INVENTION

The invention relates to a process for preparing a high-molecular polyamide, polyester or polyester-amide block copolymer by melt-mixing polyamide or a polyester or a mixture of a polyamide and a polyester having a lower molecular weight with a bislactam.

BACKGROUND OF THE INVENTION

Such a process is for example known from EP-A-0288253, in which, as in other publications, use is made of bis-N-acyl lactams having the formula:

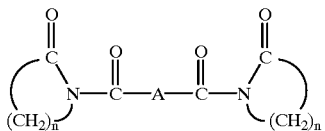

in which A=alkyl or an aromatic group and n is generally between 3 and 11.

The bis-N-acyl lactams used in the examples are generally tere- or isophthaloyl bislaurocaprolactam or biscaprolactam.

These bis-N-acyl lactams however have the drawback of a relatively low reaction rate, as a result of which long reaction times are required to realize the desired increase in molecular weight, which may lead to undesired side-reactions, e.g. discolouration of the polyamide or polyester.

In practice, bisoxazolines or bisoxazines are therefore more preferably used as chain extenders for polyamides. The drawback of these is however that they react with the polyamide's carboxylic end groups, as a result of which the polyamide obtained contains excess amino end groups and the polyester excess hydroxyl endgroups, which adversely affects the thermal oxidative stability.

SUMMARY OF THE INVENTION

The invention's aim is hence a process in which a bifunctional chain extender that does not involve the above drawbacks is added to a polyamide or a polyester melt.

DETAILED DESCRIPTION AND PREFERRED EMBODIMENTS

The inventors have now most surprisingly found that when the polyamide or the polyester having the lower molecular weight reacts in the melt with a carbonyl bislactam, a colourless, stable polyamide or polyester with increased molecular weight is very quickly obtained.

'Carbonyl bislactam' is understood to be a compound having the formula:

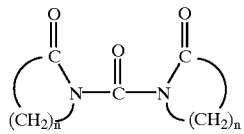

in which n is an integer of between 3 and 15. Preferably n=5 to 12.

The carbonyl bislactam can be obtained in a simple manner through reaction of the lactam with phosgene, $COCl_2$. The preparation of N,N'-carbonyl biscaprolactam via this route in benzene in the presence of a tertiary alkylamine as a catalyst is for example described in JP-A-42017832.

The amount of carbonyl bislactam used in the process according to the invention may vary within a wide range. Usually at least about 0.1 wt. %, relative to the polyamide or the polyester, will be required to obtain an appreciable effect. Amounts of more than 4 wt. % do not usually lead to a further increase in the molecular weight.

Usually a person skilled in the art will adjust the amount of carbonyl bislactam to be used to the number of amino or hydroxyl end groups available and the increase in viscosity to be realized as a result of the increased molecular weight. He will usually determine the optimum amount for his situation through simple experimentation.

In principle, the process of the invention can be used for all types of polyamides and polyesters. The polyamides include at least the aliphatic polyamides, for example polyamide-4, polyamide-6, polyamide-8 etc., polyamide-4, 6, polyamide-6,6, polyamide-6,10, etc., polyamides derived from an aliphatic diamine and an aromatic dicarboxylic acid, for example polyamide-4,T, polyamide-6,T, polyamide-4,I, etc., in which T stands for terephthalate and I for isophthalate, copolyamides of linear polyamides and copolyamides of an aliphatic and a partially aromatic polyamide, for example 6/6,T, 6/6,6/6,T, etc. The process is particularly advantageous in the case of partially aromatic polyamides and copolyamides that require in general a relatively long polymerisation time.

The polyesters include at least polyesters derived from aliphatic dicarboxylic acids and diols, polyesters from aliphatic diols and aromatic dicarboxylic acids, copolyesters that are partially aliphatic and partially aromatic and polyesters that contain units derived from cycloaliphatic dicarboxylic acids. Specific examples are polybutylene adipate, polyethylene terephthalate, polyethylene naphthalate, polybutylene terephthalate, copolyesters of polybutyleneadipate and polybutylene terephthalate, the polyester derived from butanediol and cyclohexane dicarboxylic acid.

The process according to the invention can be carried out in a simple manner using the usual melt-mixing techniques and equipment, for example by dry blending the polyamide or polyester having a lower molecular weight and the bislactam and optionally also other additives in a solid state, for example in a tumble drier, after which the mixture obtained is melted in a usual melt-mixing apparatus, for example a Haake kneader, a Brabender mixer or a single- or double-screw extruder. The different components can also be fed to the mixing apparatus separately.

Best results are obtained if the lower molecular polyamide or polyester are thoroughly dried.

Preferably the carbonyl bislactam is added to the melted polyamide or polyester product stream in the polymerisation process as it leaves the polymerisation reactor. The polymerisation process can be carried out both batchwise or in a continuous mode. In the first case a reduction of the residence time in the reactor can be realized and thus an increase in productivity; with the continuous process the after-condensation step, that is necessary usually to obtain a polyamide or polyester of sufficient molecular weight can be avoided.

The invention will now be elucidated with reference to the following examples, without however being limited thereto.

Materials Used a.1. polyamide-6 having a $\eta_{rel}$=2.56 measured in formic acid and a concentration of end groups—COOH=0.052 meq/g —$NH_2$=0.052 meq/g.

a.2. polyethylene terephthalate, PET, having a $\eta_{rel}$=1.44, measured in m-cresol b.1. carbonyl biscaprolactam (CBC); from Isochem, France.

b.2. N,N'-isophthaloyl biscaprolactam (IBC): from DSM RIM NYLON, the Netherlands.

c. 1,3 phenylene bisoxazoline (1.3 PBO): from Takeda Chemicals, Japan.

Process

The polyamide was melted in a Brabender mixer, type Plasticorder 651, at 240° C. until a constant torque of the kneaders was obtained, after which the bislactam was added and the mixing was continued. The kneaders' torque was measured at different times. The mixing was carried out at a rotational speed of the kneaders of 30 rotations per minute, under a nitrogen blanket to prevent the risk of the polyamide decomposing as a result of oxidation.

Table 1 shows the compositions investigated and the results of the measurements.

The results of Experiments 2 vs. 4 show the surprisingly high activity of the carbonyl lactam, as a result of which a stable high value of the melt viscosity (expressed as the Brabender mixer's moment of couple) was obtained after 2 minutes already, whereas this is not the case when use is made of the bislactam according to the state of the art.

Thanks to this short reaction time, which is of the same order as the residence time in a normal extrusion, a stable, increased melt viscosity can be realized in practice, and the molecular weight of polyamide can be increased, using only a bislactam.

The relative viscosity, measured in a solution of 1 gram in 100 ml of 90 wt. % formic acid, shows the same development as the measured moments of couple after 10 minutes.

TABLE 1

| Experiment | 1 | 2 | 3 | 4 | 5 | 6 |
|---|---|---|---|---|---|---|
| Composition (parts by weight) | | | | | | |
| a.1. | 100 | 100 | 100 | 100 | 100 | 100 |
| b.1. *) CBC | | 0.666 | 0.666 | | | |
| b.2. *) IBC | | | | 0.940 | | 0.940 |
| c. *) PBO | | | 0.570 | | 0.570 | 0.570 |
| Kneader couple-moment (Nm) | | | | | | |
| 2 min. | 6.0 | 9.5 | 10.5 | 7.0 | 6.0 | 8.4 |
| 4 min. | 6.0 | 9.5 | 13.5 | 7.2 | 7.5 | 10.5 |
| 6 min. | 6.0 | 9.5 | 16.5 | 8.5 | 8.5 | 11.5 |
| 10 min. | 6.0 | 9.5 | 19.5 | 8.4 | 10.5 | 13.0 |
| relative viscosity (10 min.) in formic acid | 2.6 | 2.9 | 3.9 | 2.7 | 2.9 | 3.2 |

*) The quantity (b) resp. (c) was chosen equivalent to the number of amino resp. carboxyl end groups available in the polyamide.

The process of the foregoing experiments was repeated however with polyethylene terephthalate having a solution viscosity of 1.44 in m-cresol. The temperature was set at 180° C. Compositions and results are given in Table 2.

TABLE 2

| Experiment | 7 | 8 | 9 | 10 | 11 | 12 |
|---|---|---|---|---|---|---|
| Composition (parts by weight) | | | | | | |
| a.2. | 100 | 100 | 100 | 100 | 100 | 100 |
| b.1. CBC **) | | | | 0.96 | | 0.96 |
| b.2. IBC **) | | | 1.35 | | 1.35 | |
| c. PBO **) | | 0.27 | | | 0.27 | 0.27 |
| Kneader couplemoment (Nm) | | | | | | |
| 2 min. | 0.5 | 1.0 | 1.5 | 1.5 | 2.0 | 1.5 |
| 4 min. | 0.5 | 1.0 | 2.0 | 2.0 | 2.5 | 2.0 |
| 6 min. | 0.5 | 1.0 | 2.5 | 2.0 | 3.5 | 2.5 |
| 10 min. | 0.5 | 1.0 | 2.5 | 2.5 | 4.5 | 2.5 |
| relative viscosity (10 min.) in m-cresol 1 wt. %, 135° C. | 1.44 | 1.47 | 1.62 | 1.62 | 1.68 | 1.64 |

**) The quantity (b) resp.(c) was chosen equivalent to the number of hydroxyl resp. carboxyl end groups.

Analysis of the endgroups after 10 minutes meltmixing reveals for the compositions the following data:

TABLE 3

| Experiment | COOH— [meq/gram] | OH— [meq/gram] |
|---|---|---|
| 7 | 0.041 | 0.083 |
| 8 | 0.026 | 0.085 |
| 9 | 0.046 | 0.031 |
| 10 | 0.029 | 0.047 |
| 11 | 0.027 | 0.028 |
| 12 | 0.018 | 0.045 |

Apparently the carboxy biscaprolactam (CBC) is also reactive with the carboxyl endgroups. IBC reacts with the hydroxyl end groups only, and seems to be more effective. However also IBC shows to be effective for 50% only. For this reason the added quantities IBC and CBC were increased in a further experiment by 50%. Very surprisingly in this case CBC showed much more effectivity than IBC. Results are given in Table 4.

TABLE 4

| Experiment | —COOH meq/gram | $\eta_{rel}$ | remarks |
|---|---|---|---|
| 7 | 0.041 | 1.44 | |
| 9 *) | 0.045 | 1.63 | |
| 13 | 0.045 | 1.69 | 2.03 pbw IBC |
| 10 *) | 0.028 | 1.65 | |
| 14 | 0.021 | 1.77 | 1.44 pbw CBC |

*) duplo experiments

Therefore CBC is used in polyesters preferably in excess of the equivalent quantity calculated on the basis of hydroxyl endgroups available in the lower molecular polyester of which the molecular weight should be increased.

The molecular weight of the polyamide or polyester having the lower molecular weight may vary over a wide range and is mainly determined by economical reasons and the source of the material. In general it may vary from about 1,000 to about 20,000 expressed as the number average molecular weight Mn. However, situations are possible in which a mixture containing a polyamide or polyester of high molecular weight, for instance, 25,000, and an appreciable fraction oligomeric polyamide or polyester of molecular weight less than 1,000 is reacted in the melt with the CBC according to the present invention.

The molecular weight of the high molecular weight polyamide or polyester to be produced by the process of the invention can be freely chosen and generally is higher than 15,000, preferably higher than 20,000, even more preferably higher than 25,000.

The polyamide or polyester obtained by the process of the invention can be processed by injection moulding, extrusion or blow moulding to obtain moulded articles, and by melt spinning to obtain fibres.

What is claimed is:

1. A process for preparing a polyester-amide block copolymer with increased molecular weight comprising reacting a mixture of polyester and polyamide having a lower molecular weight in the melt with bislactam, wherein said bislactam is a carbonyl bislactam having the formula

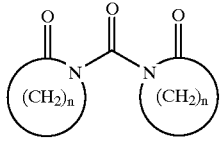

in which n is an integer from 3 to 15.

2. A process according to claim 1, wherein the mixture of polyester and polyamide having lower molecular weight is thoroughly dried.

3. A process according to claim 1, wherein said carbonyl bislactam is added to a melted polyester or polyamide product stream in a polymerization process as it leaves a polymerization reactor.

4. Process according to claim 1, wherein the molecular weight of said increased molecular weight polyester-amide block copolymer is higher than 15,000.

5. Process according to claim 1, wherein the molecular weight of said increased molecular weight polyester-amide block copolymer is higher than 20,000.

6. Process according to claim 1, wherein the molecular weight of said increased molecular weight polyester-amide block copolymer is higher than 25,000.

7. A process according to claim 1, wherein the carbonyl bislactam is carbonyl biscaprolactam.

* * * * *